UNITED STATES PATENT OFFICE.

CHARLES CLIFTON HUFFMAN, OF CHICAGO, ILLINOIS, ASSIGNOR TO SUNBEAM CHEMICAL COMPANY, OF CHICAGO, ILLINOIS, A CORPORATION OF ILLINOIS.

DARK DYE COMBINED WITH SOAP AND PROCESS OF PRODUCING THE SAME.

1,413,026.   Specification of Letters Patent.   Patented Apr. 18, 1922.

No Drawing.   Application filed December 31, 1917. Serial No. 209,702.

*To all whom it may concern:*

Be it known that I, CHARLES C. HUFFMAN, a citizen of the United States, and resident of Chicago, in the county of Cook and State of Illinois, have discovered a certain new and useful Dark Dye Combined with Soap and Process of Producing the Same, of which the following is a specification.

My invention relates to dyes and particularly to a novel dye combined with soap.

Many of the features of the present invention were heretofore described in my prior co-pending applications, Serial Nos. 192,871; 192,872; 192,873 and 192,874, filed September 24, 1917.

I am aware that it is not new to mechanically combine a dye with a soap this having been practiced more or less successfully for many years. While an article produced in the manner referred to from the proper materials will be satisfactory in certain colors, it has been found to be entirely inadequate for general use. In the applications heretofore referred to I have disclosed a product and process of producing the same wherein a new dye is formed by a chemical combination with the soap constituents. However, it has so far been found impossible to produce the dark shades by the use of this process alone. There is apparently a point of saturation beyond which no further dye is taken up and in all cases wherein the attempt has been made to produce dark colors by the use of a sufficient quantity of the dye, the excess dye remained undissolved and appeared as spots on the dyed article. No amount of boiling appeared to have any effect on this situation.

I have, however, devised a process by which the difficulties referred to are overcome and a sufficient quantity of dye may be combined with the soap solution to produce any of the dark colors. The desired result is secured by proceeding in accordance with the disclosures of the applications heretofore referred to up to the point at which the substance would ordinarily be ready for the molding process. A quantity of water is then added and heat applied to evaporate the added water. After this is done the product will be found to contain no undissolved dye all thereof having been changed by chemical combination with the other constituents. It does not avail to add the excess of water in the first instance and evaporate the same by continued boiling. If the water is added in the first instance no amount of boiling serves to effect the desired result.

The only explanation of this apparent phenomenon is that during the initial reaction the excess dye over that required to effect the necessary readjustment of molecules remains undissolved until the reaction is complete after which by the addition of water and heat the formed compound acts as a catalyst in the formation of a further quantity by readjustment of the undissolved dye and the excess of sodium hydroxide in the compound. It may be that on the addition of water and continued application of heat the original compound is broken up and reformed, but this theory will undoubtedly be found untenable for the reason that the same results are not secured if the water and heat are added during the formation of the original compound. In other words, it seems essential that the reaction in the formation of the compound must be completed, or substantially so, whereupon the additional dye, which had no affinity for the remaining constituents of the compound is, by the assistance of the formed compound as a catalyst, caused under the action of heat to form a new bond with the absorbed constituents.

The method by which the desired result is secured is as follows:

The oil or fat necessary for the solution is mixed with a quantity of sodium hydroxide, or similar saponifying agent, materially in excess of that required for complete saponification. This is done at ordinary room temperature. The following reaction is permitted to continue until it is practically complete. In the meantime the requisite amount of an acid, alkali or neutral dye is mixed with a quantity of boiling water sufficient to form a thick solution, which quantity corresponds substantially to the theoretical amount necessary to the formation of the compound and which would in the process heretofore employed remain in the compound. The dye mixture is added to the saponified solution just prior to complete saponification, the heat of the dye solution together with the heat of the subsequent reaction raising the temperature of the mass somewhat. After the required mixing and after the reaction is complete, a quantity of water, usually about one gallon for a five gallon batch is added. Heat is then applied and the excess of water is evaporated after which the product is molded or otherwise treated in the usual manner. There will be found to be no undissolved dye and the desired dark shades will be produced on silk, wool or cotton. The fact that a universal dye is produced which is alkali-proof and which will not stain the hands of the user is entirely novel. The presence of undissolved dye in the compound will cause staining of the user's hands. This is a practically infallible test as, unless the dye is chemically changed and combined with the other constituents, it will act in its normal capacity and permanently stain or color the hands or utensils of the user.

This disclosure is made in the light of experiments and practices up to the present time. The results accomplished and the method of accomplishing the results are definitely established. I am not certain that the reasons herein given as to why the results are accomplished are correct and I do not therefore wish to be limited in the scope of the invention except as indicated by the appended claims.

I claim:

1. The process of manufacturing a dye soap having the capacity of producing dark shades, comprising the steps of mixing the oil, the saponifying agent, the required quantity of dye and the quantity of water required to produce a moldable product, then permitting the reaction to proceed to completion, then adding a further quantity of water and applying heat to evaporate the excess water, substantially as described.

2. The method of effecting the chemical combination of a sufficient quantity of dye to produce dark shades with a saponified substance whereby to provide a dye soap, which consists in mixing an oil with an excess of sodium hydroxide, then separately mixing the required amount of dye with sufficient water to form a thick solution, then adding the dye solution to the soap solution just prior to complete saponification, then permitting the reaction to become complete, then adding water and heating to evaporate the added water, substantially as described.

3. The method of producing dark shades of dye in chemical combination with a saponified substance, comprising in combination the steps of mixing the full amount of dye employed in a quantity of water sufficient to produce a pasty mass, then adding the mass to an incompleted saponified soap solution, then adding a further quantity of water and increasing the heat to evaporate the excess water, substantially as described.

4. A method of producing dark colored dyes in chemical combination with a saponified substance which consists in mixing an oil with an amount of alkali in excess of the theoretical amount required for complete saponification, then mixing a quantity of dye sufficient to produce the requisite dark shade in a quantity of water substantially equal to that required to be in the completed substance, then adding the dye to the soap solution just before complete saponification and permitting the reaction to continue until completed, then adding a quantity of water, then evaporating the water by applying heat to the solution, substantially as described.

Signed at Chicago, Ill., this 28th day of December, 1917.

CHARLES CLIFTON HUFFMAN.

Witness:
T. D. BUTLER.